H. & C. SHIRK.
Wheel Harrow.
No. 99,719.           Patented Feb. 8, 1870.
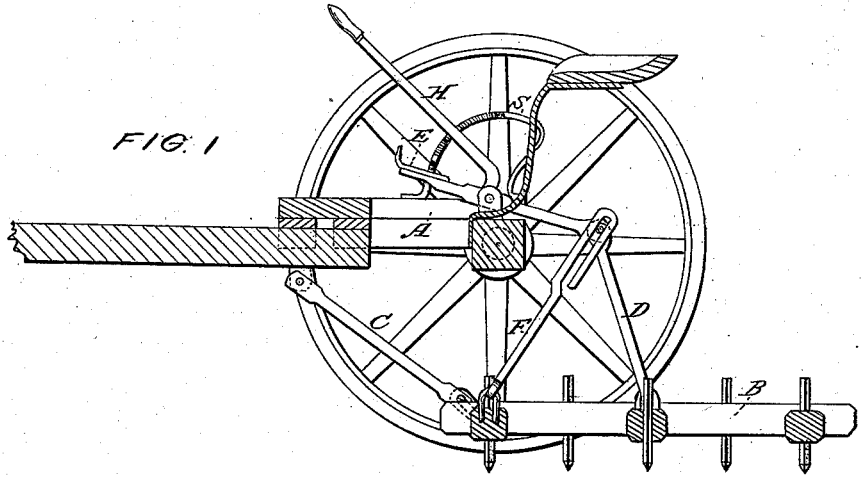
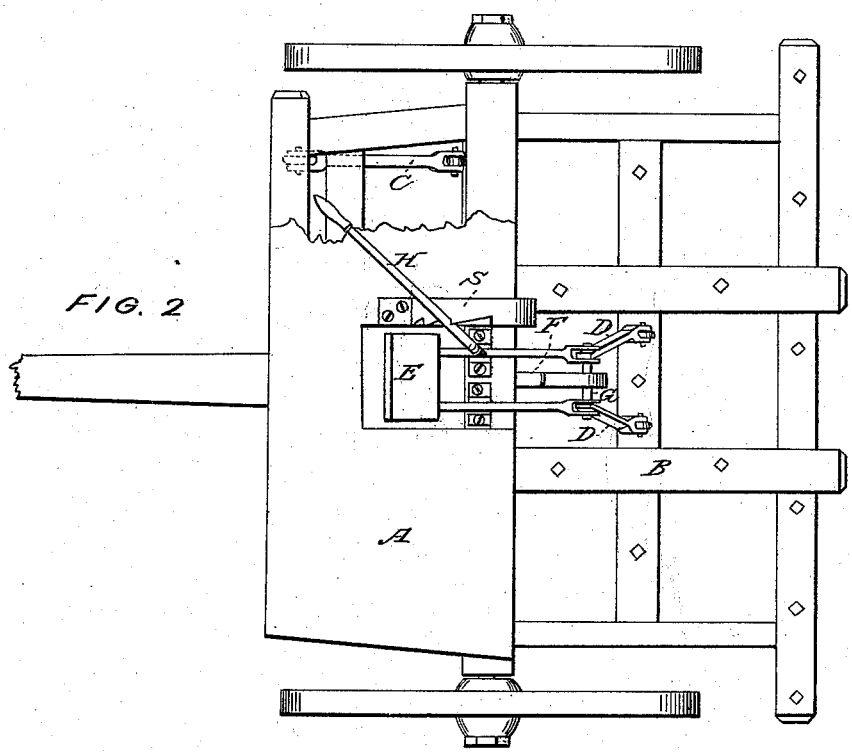
WITNESSES:
E. W. Anderson
D. D. Kane
INVENTORS:
H. Shirk
C. Shirk
Chipman Hosmer & Co.
Attys

United States Patent Office.

HENRY SHIRK AND CYRUS SHIRK, OF LEBANON, PENNSYLVANIA.

Letters Patent No. 99,719, dated February 8, 1870.

IMPROVEMENT IN HARROW.

The Schedule referred to in these Letters Patent and making part of the same

*To all whom it may concern:*

Be it known that we, HENRY SHIRK and CYRUS SHIRK, of Lebanon, in the county of Lebanon, and State of Pennsylvania, have invented a new and valuable Improvement in Harrows; and we do hereby declare that the following is a full, clear, and exact description of the construction and operation of the same, reference being had to the annexed drawings, making a part of this specification, and to the letters and figures of reference marked thereon.

Figure 1, of the drawings, is a representation of a central vertical section of my harrow and sulky.

Figure 2 is a top view of the same with part of platform removed.

Our invention relates to that class of harrows which is arranged for attachment to sulkies; and It consists in a novel arrangement of devices, by which such harrow may be raised or lowered at the operator's will, without leaving his seat upon the sulky.

The letter A, of the drawings, represents a sulky, and

Letter B, our harrow attached thereto, and operated by the means following, namely:

We construct two braces or rods, C, and hinge them respectively to the front cross-bar of the harrow at either end, and also to the front part of the sulky-platform as shown in fig. 2 at the point broken off, and also on fig. 1.

To the middle beam of the harrow, we attach the rods or bars D, in the manner shown in the drawings, and also connect said bars, respectively, with the rear end of treadle E, hereinafter mentioned, by suitable hinges or pivots, as shown.

The letter F represents a hook, rigidly attached at its lower end to the front bar of the harrow, and adapted for hooking over the rod G that forms the rear connecting-bar of the treadle E, in the manner shown.

The letter E' represents a treadle, pivoted upon the axle immediately below the driver's seat, and adapted for operation by the driver's foot.

The letter H represents a lever, attached by pivot or hinge to the side of treadle E, in the manner shown, and adapted for operation by the driver's hand.

The letter S represents a ratchet-bar, arranged upon the platform of the sulky, in the manner shown, and adapted for operation with the lever H, as hereinafter mentioned.

Our harrow is raised from the ground sufficiently for ordinary purposes, by means of the hand-lever H, and it is held in the desired position by placing the edge of said lever under one of the teeth on the ratchet-bar. But when we desire to raise the harrow to any considerable distance from the ground, to pass large obstacles, the operator forces down the treadle with his foot, and thereby secures the offices of the hook F in aiding to raise the entire harrow at once, and suspending it in the air.

What we claim as our invention, and desire to secure by Letters Patent, is—

The sulky-harrow herein described, having sulky A, harrow B, rods C and D, treadle E, hook F, lever H and ratchet S, constructed and arranged to operate substantially as specified.

In testimony that we claim the above, we have hereunto subscribed our name, in the presence of two witnesses.

HENRY SHIRK.
CYRUS SHIRK.

Witnesses:
BAPLER BOYER,
ANTHONY S. ELY.